United States Patent
Terbu et al.

(10) Patent No.: US 11,433,845 B2
(45) Date of Patent: Sep. 6, 2022

(54) AIRBAG ASSEMBLY WITH REDUCED PACKAGE SIZE AND RELATED METHOD

(71) Applicant: AUTOLIV ASP, INC., Ogden, UT (US)

(72) Inventors: John Erik Terbu, Clinton, UT (US); Allen Murry Chambers, Syracuse, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 88 days.

(21) Appl. No.: 16/677,978

(22) Filed: Nov. 8, 2019

(65) Prior Publication Data

US 2021/0138992 A1    May 13, 2021

(51) Int. Cl.
| | |
|---|---|
| *B60R 21/201* | (2011.01) |
| *B60R 21/232* | (2011.01) |
| *B60R 21/2165* | (2011.01) |
| *B60R 21/2342* | (2011.01) |
| *B60R 21/237* | (2006.01) |
| *B60R 21/215* | (2011.01) |

(52) U.S. Cl.
CPC .......... *B60R 21/215* (2013.01); *B60R 21/201* (2013.01); *B60R 21/2165* (2013.01); *B60R 21/232* (2013.01); *B60R 21/237* (2013.01); *B60R 21/2342* (2013.01); *B60R 2021/21506* (2013.01)

(58) Field of Classification Search
CPC ... B60R 21/201; B60R 21/232; B60R 21/215; B60R 21/2165; B60R 21/2342; B60R 21/237; B60R 21/213; B60R 21/23138; B60R 21/2176; B60R 21/214

USPC ............................................ 280/730.2, 728.2
See application file for complete search history.

(56) References Cited

U.S. PATENT DOCUMENTS

| | | | |
|---|---|---|---|
| 7,083,188 B2 * | 8/2006 | Henderson | B60R 21/201 |
| | | | 280/728.2 |
| 7,823,914 B2 * | 11/2010 | Cheal | B60R 21/201 |
| | | | 280/730.2 |
| 7,980,585 B2 | 7/2011 | Cheal | |
| 9,205,797 B2 | 12/2015 | Ostman et al. | |
| 2005/0082798 A1 | 4/2005 | Tallerico et al. | |

(Continued)

OTHER PUBLICATIONS

Co-pending U.S. Appl. No. 16/622,745, filed Dec. 13, 2019 entitled "Side Airbag Module and Vehicle Seat".

(Continued)

*Primary Examiner* — Keith J Frisby
(74) *Attorney, Agent, or Firm* — Harness, Dickey & Pierce, P.L.C.; Stephen T. Olson (57) ABSTRACT

An airbag assembly for a motor vehicle includes an inflatable airbag and a reinforcing wrapper. The inflatable airbag has a longitudinally extending axis and is rolled about a rotation axis in the stowed condition. The reinforcing wrapper is coupled to the inflatable airbag proximate a first longitudinally extending side of the inflatable airbag, rolled about the rotation axis and wrapped entirely around at least a first portion of the inflatable airbag. The inflatable airbag and the reinforcing wrapper cooperative to define a monotonously rolled portion of the airbag assembly. In certain applications, the reinforcing wrapper is secured to a tab used to hang the inflatable airbag in the motor vehicle.

16 Claims, 6 Drawing Sheets

(56) References Cited

U.S. PATENT DOCUMENTS

| | | | |
|---|---|---|---|
| 2008/0284142 A1* | 11/2008 | Cheal | B60R 21/213 |
| | | | 280/730.2 |
| 2011/0042923 A1* | 2/2011 | Hatfield | B60R 21/232 |
| | | | 280/730.2 |
| 2011/0057422 A1 | 3/2011 | Cheal et al. | |
| 2013/0161930 A1* | 6/2013 | Moffitt | B60R 21/232 |
| | | | 280/730.2 |
| 2017/0247008 A1* | 8/2017 | Witt, Jr. | B60R 21/201 |
| 2018/0111579 A1* | 4/2018 | Shimizu | B60R 21/201 |
| 2021/0031719 A1* | 2/2021 | Montgomery | B60R 21/232 |

OTHER PUBLICATIONS

International Search Report and Written Opinion received for the PCT Application No. PCT/US2020/054329, dated Nov. 27, 2020, 14 pages.

\* cited by examiner

AIRBAG ASSEMBLY WITH REDUCED PACKAGE SIZE AND RELATED METHOD

FIELD

The present disclosure relates to inflatable restraints for motor vehicle safety systems. More particularly, the present disclosure relates to an airbag assembly for a motor vehicle, the airbag assembly having a reduced package size. The present disclosure also relates to a method of manufacturing an airbag assembly to have a reduced package size.

BACKGROUND

This section provides background information related to the present disclosure which is not necessarily prior art.

Inflatable safety restraint devices or airbags are commonly included on motor vehicles. In the event of an accident, a sensor within the vehicle measures abnormal deceleration and triggers ignition of a charge contained within an inflator. Expanding gases from the charge travel through conduits and fill the airbags, which instantaneously inflate to protect passengers within the vehicle from harmful impact with the interior of the vehicle. Typically, airbags are concealed within the vehicle trim to be invisible during normal vehicle operation.

In addition to airbag systems designed for frontal impacts, conventional airbag systems include airbag systems for the protection of vehicle occupants from lateral impacts, oblique impacts and vehicle rollovers. The Inflatable airbags of such systems are typically stowed along the corner of the vehicle where the vehicle roof meets the side windows and pillars and also stowed within pillars of the vehicle. The area available for storing such airbag systems is limited in size and varies from vehicle to vehicle.

It is generally known that the packaging size of an airbag may be reduced and maintained prior to deployment with a cover that extends around at least a portion of the airbag. For example, commonly assigned U.S. Pat. No. 9,205,797 discloses an airbag that is held under compression by a cover. The cover, which is formed from a ductile fabric material including polymeric fibers, is simply folded around and over the airbag package and fused together to impart a stable shape. U.S. Pat. No. 9,205,797 is hereby incorporated by reference as if fully set forth herein.

While known airbag assemblies have proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide an airbag assembly with a reduced package size suitable for A-pillar storage and storage within other space restricted areas.

It is another object of the present teachings to provide an airbag assembly and related method in which the inflatable airbag and a reinforcing wrapper are both monotonously rolled about a common axis.

In accordance with one particular aspect, the present teachings provide an airbag assembly for a motor vehicle including an inflatable airbag and a reinforcing wrapper. The inflatable airbag has a longitudinally extending axis and is rolled about a rotation axis in the stowed condition. The reinforcing wrapper is coupled to the inflatable airbag proximate a first longitudinally extending side of the inflatable airbag, rolled about the rotation axis and wrapped entirely around at least a first portion of the inflatable airbag. The inflatable airbag and the reinforcing wrapper cooperate to define a monotonously rolled portion of the airbag assembly.

In accordance with another particular aspect, the present teachings provide an airbag assembly for a motor vehicle including an inflatable airbag deployable from a stowed condition, at least a first mounting tab and a reinforcing wrapper. The inflatable airbag has a longitudinally extending axis and is rolled or folded about the longitudinal axis in the stowed condition. The first mounting tab is secured to the inflatable airbag. The reinforcing wrapper is secured to the first mounting tab and peripherally wrapped entirely around at least a first portion of the inflatable airbag. The reinforcing wrapper holds at least the first portion of the inflatable airbag under compression with a reduced package size.

In accordance with still another particular aspect, the present teachings provide a method of manufacturing an airbag assembly having a portion with a reduced package size including coupling a reinforcing wrapper to the inflatable airbag and preparing an intermediate package by rolling and/or folding the inflatable airbag and wrapping the reinforcing wrapper entirely around a periphery of the inflatable airbag. The method additionally includes heating the intermediate package with an infrared oven to a predetermined temperature while the intermediate package is in a nest of a pressing tool. The method further includes pressing the intermediate package to reduce a package size of the portion of the airbag assembly.

In accordance with still yet another particular aspect, the present teachings provide a method of manufacturing an airbag assembly having an inflatable airbag and a reinforcing wrapper. The method includes coupling the reinforcing wrapper to the inflatable airbag proximate a first longitudinally extending edge of the inflatable airbag. The method additionally includes rolling the inflatable airbag about a rotation axis beginning with a second longitudinally extending edge of the inflatable airbag. The method further includes rolling the reinforcing wrapper entirely around a periphery of at least a first portion of the inflatable airbag such that the inflatable airbag and the reinforcing wrapper cooperate to define a monotonously rolled portion of the airbag assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to," "coupled to" and "secured to" refer to any form of interaction between two or more entities, including mechanical, electrical, magnetic, electromagnetic, fluid, and thermal interaction. Two components may be coupled to each other even though they are not in direct contact with each other. For example, the two components may be "connected", "coupled" or "secured" to one another through one or more intermediate elements. The term "proximate" refers to a relative positioning between items that may or may not be in direct physical contact with each other. "Exemplary" as used herein means serving as a typical or representative example or instance, and does not necessarily mean special or preferred.

With general reference to drawings, an airbag assembly in accordance with the present teachings is illustrated and generally identified at reference character 10. The airbag assembly 10 is part of an occupant restraint system 12 of a motor vehicle 14. In the embodiment illustrated throughout the drawings, the airbag assembly is a curtain airbag assembly 10. Certain aspects of the present teachings may, however, be used in connection with other airbags.

The motor vehicle 14 shown in the drawings will be understood to be exemplary in nature. The motor vehicle 14 has a longitudinal direction 16 oriented along the length of the motor vehicle 14, a lateral direction 18 oriented from one side of the motor vehicle 14 to the opposing side and a vertical direction 20 oriented vertically up and down. The terms "inboard" and "outboard" may be used herein to refer to a relative orientation in the lateral direction 18. For example, "outboard" refers to a relative location closer to or facing a lateral plane of the vehicle than a longitudinal center plane of the motor vehicle. Conversely, "inboard" refers to a relative location closer to or facing the longitudinal center plane of the vehicle than a lateral side of the motor vehicle. "Inboard" and "outboard" do not require alignment of the two objects in the lateral direction 18; rather, these terms simply relate to proximity to the lateral or medial planes as set forth above.

Among other aspects, the present teachings are particularly directed to a reinforcing wrapper 22 for holding at least a portion of an inflatable airbag 24 of the airbag assembly 10 in a stable condition, under compression and with a reduced package size. In such a stable condition, the airbag assembly 10 may be more easily shipped and more easily stowed within areas having space restrictions. Before addressing details of the reinforcing wrapper 22 and its cooperative interaction with the inflatable airbag 24, a description of other features of the airbag assembly is warranted.

The airbag assembly 10 may conventionally include an inflator 26, a tube 28, and the inflatable airbag 24. The inflatable airbag 24 receives gas from the inflator 26 through the tube 28. The airbag assembly 10 also includes a sensor and a control system (not shown) that detects a collision/rollover or impending collision/rollover and transmits an activation signal to the inflator 26. The inflator 26 may be one of several types, such as pyrotechnic, stored gas, or a combination inflator and may be a single or multistage inflator. The inflator 26 may be stored at any suitable location relative to the inflatable airbag 24. If the inflator 26 is a pyrotechnic inflator, the inflator 26 may contain a propellant that ignites to rapidly produce inflation gas in response to receipt of the activation signal.

Figure 1:
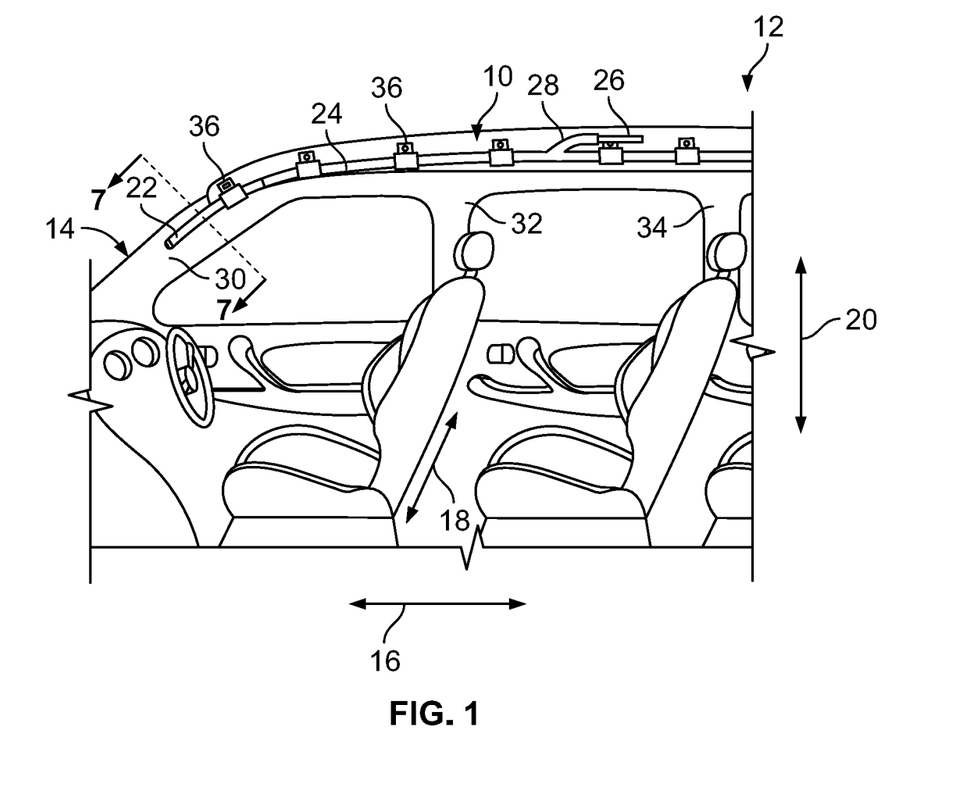
FIG. 1 is a side view of an airbag assembly in accordance with the present teachings, the airbag assembly shown in a stowed configuration within an exemplary motor vehicle.
Figures 2, 2A, 2B:
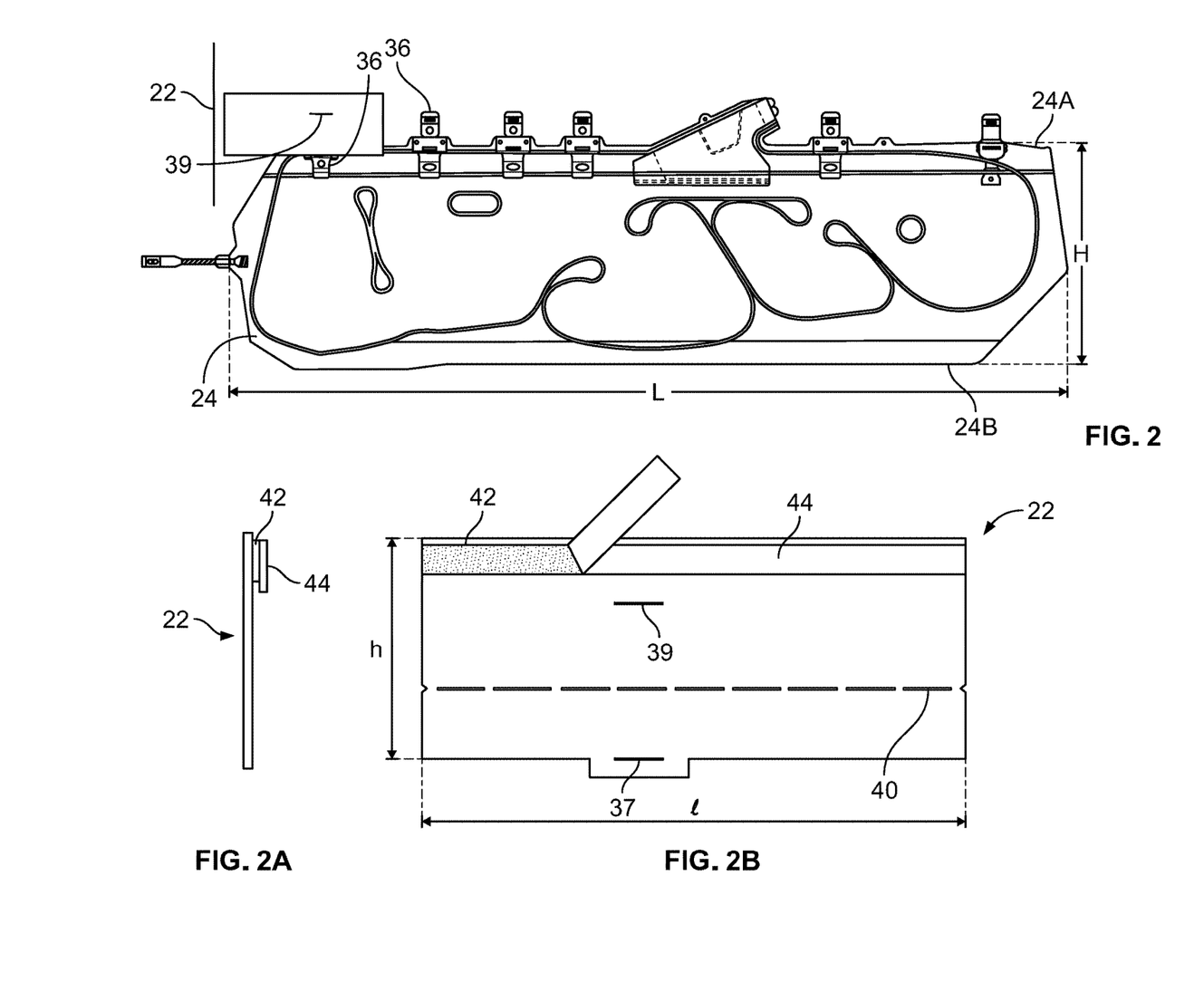
FIG. 2 is a side view of the airbag assembly of FIG. 1, an inflatable airbag of the airbag assembly shown unrolled from the stowed configuration and prior to inflation.
FIG. 2A is a side view of a wrapper of the airbag assembly of FIG. 1.
FIG. 2B is a top view of the wrapper of FIG. 2A.
Figure 3:
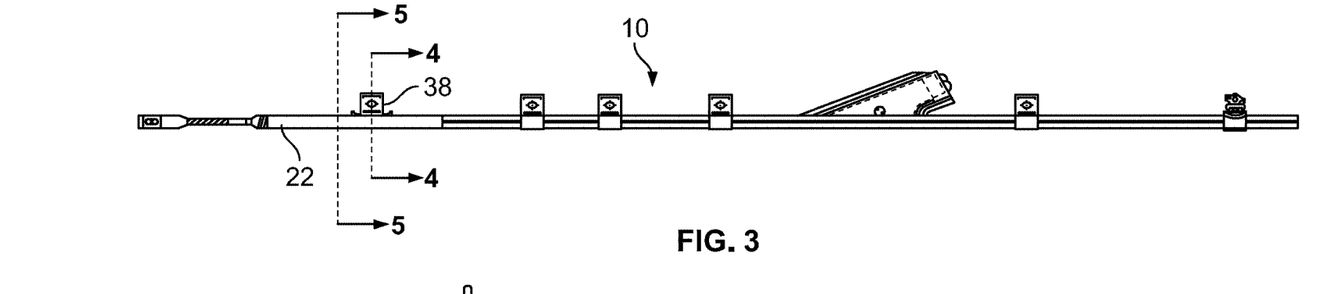
FIG. 3 is another side view illustrating the airbag assembly of the present teachings, the airbag assembly shown ready for shipment or installation within a vehicle.

The inflatable airbag 24 may define one or more inflatable chambers between an outboard panel and an inboard panel and may extend along the longitudinal direction 16 within the vehicle 14 in both the stowed condition (as shown in FIG. 1) and the deployed condition (not particularly shown). The inflatable airbag has a length L in the longitudinal direction 16, a height H in the vertical direction 20, and a depth in the lateral direction 18. In the embodiment illustrated, the inflatable airbag 24 has a length L that is greater than the height H. In other applications, the height H may be greater than the length L. The inflatable airbag 24 may be coupled to or next to a roof rail of the motor vehicle 14. In the embodiment illustrated, a forward portion of the inflatable airbag 24 is stowed within an A-pillar 30 of the vehicle 14.

The inflatable airbag 24 may be secured to the motor vehicle 14 with a plurality of mounting assemblies 36 distributed along the length of the inflatable airbag 24. Each of the mounting assemblies 36 may conventionally include a tab 38 sewn or otherwise suitably secured to the inflatable airbag 24 proximate an upper longitudinally side 24A of the inflatable airbag 24. The tabs 38 may be conventionally secured to the roof rail with fasteners.

The inflatable airbag 24 may normally reside in a stowed configuration, in which the inflatable airbag 24 is concealed behind the interior trim of the vehicle 14. For example the inflatable airbag 24 may be stowed behind a lateral headliner trim and an A-pillar trim. Prior to installation in the motor vehicle 14, the inflatable airbag 24 may be rolled and/folded into a stowed orientation or configuration, such that the inflatable airbag 24 assumes an elongated shape extending along a pathway with a length that is much greater than the height or width of its cross-sectional shape. In the embodiment illustrated, the inflatable airbag 24 is rolled about a rotation axis A. More specifically, the inflatable airbag 24 is monotonously rolled about the rotation axis A.

The reinforcing wrapper 22 functions to maintain at least a portion of the inflatable airbag 24 under compression with a reduced package size while the inflatable airbag is in the stowed configuration. In the embodiment illustrated, the reinforcing wrapper 22 may be generally rectangular in shape. In particular applications, the reinforcing wrapper 22 has a length between approximately 300 mm and 350 mm and a height between approximately 100 mm and 150 mm. In one specific application, the reinforcing wrapper 22 has a length of approximately 330 mm and a height of approximately 132 mm. As such, the reinforcing wrapper 22 is adapted to cooperate with a limited portion of the inflatable airbag 24. In other applications, the reinforcing wrapper 22 may be longer to cover a greater portion of the inflatable airbag 24, including substantially the entire inflatable airbag 24. It will be understood that the representative wrapper dimensions provided herein may be readily adapted for other specific uses within the scope of the present teachings.

The reinforcing wrapper 22 includes a longitudinally extending tear seam 40. The perforations of the tear seam 40 may be tuned to control the timing and direction of the trajectory of the inflatable airbag 24 upon deployment.

As illustrated, the reinforcing wrapper 22 further includes a longitudinally extending adhesive strip 42 that may be covered by a removable, paper backer 44. As will be discussed below, the adhesive strip 42 secures the free edge of the reinforcing wrapper 22 after the reinforcing wrapper 22 is placed about the rolled or folded airbag 24. The dimensions of the adhesive strip and paper backer 44 may vary within the scope of the present teachings. In alternative applications, the adhesive strip 42 and paper backer 44 may be replaced with a hook and loop type fastening arrangement (i.e., Velcro®) or other fastening type of arrangement.

Figure 4:
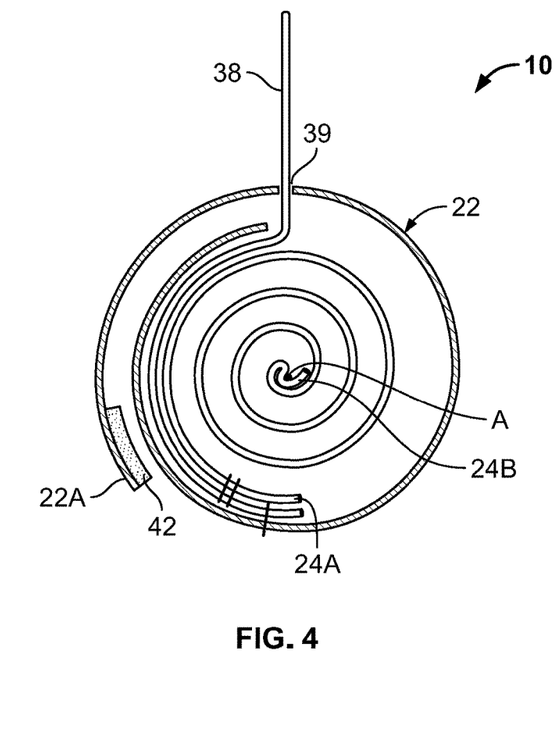
FIG. 4 is a simplified cross-sectional view taken along the line 4-4 of FIG. 3, for purposes of illustration, the inflatable airbag is not shown tightly compressed.
Figure 5:
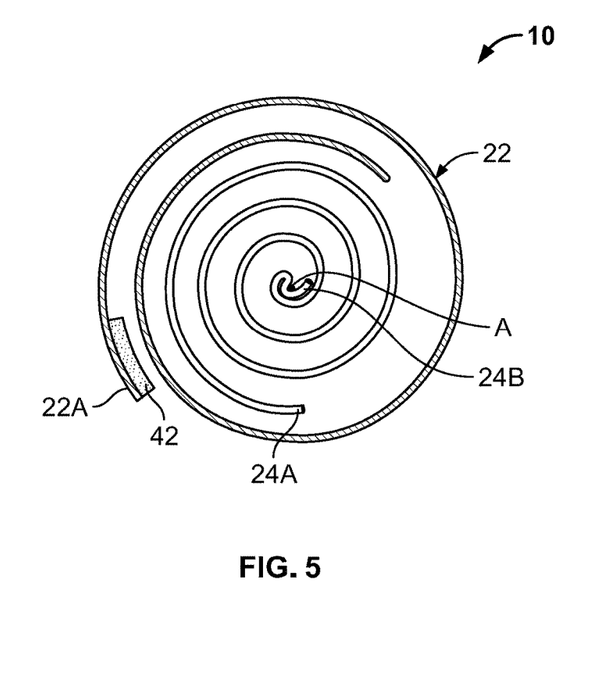
FIG. 5 is a simplified cross-sectional view taken along the line 5-5 of FIG. 3, again for purposes of illustration, the inflatable airbag is not shown tightly compressed.
Figure 6:
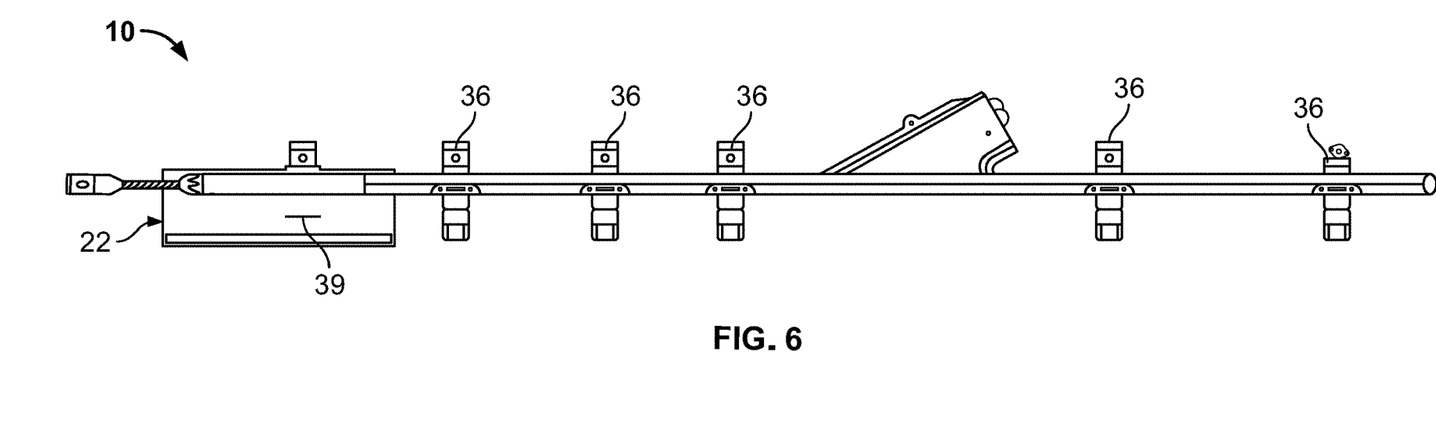
FIG. 6 another side view similar to FIG. 2, illustrating the airbag assembly after an intermediate manufacturing step during which the inflatable airbag is rolled.

The reinforcing wrapper 22 may be coupled to the inflatable airbag 24. In accordance with the present teachings, the reinforcing wrapper is coupled to the inflatable airbag 24 proximate a first longitudinally extending side 24A of the inflatable airbag 24. As particularly shown in the cross-sectional view of FIG. 4, the reinforcing wrapper 22 may be sewn or otherwise suitably secured to at least one of the tabs 38 of the mounting assemblies 36. In other applications, the reinforcing wrapper 22 may be directly sewn or otherwise suitably secured directly to the inflatable airbag 24. As shown, the tab 38 of one of the mounting assemblies 36 may pass through a first opening or slot 37 in the reinforcing wrapper 22.

The reinforcing wrapper 22 may be constructed of a non-woven fabric comprising a plurality of polymeric fibers. The non-woven fabric is provided in the form of a felt. An exemplary material considered particularly suitable for use with the present teachings is a polyester felt produced by a known needle technique in which a needling process is used to entangle and lock together the constituent polyester fibers of the material. In certain applications, the polyester fibers may be selected from a group consisting of polyethylene terephthalate (PET) fibers, co-polyethylene terephthalate (co-PET) fibers and combinations thereof.

In accordance with a method of the present teachings, the airbag assembly 10 is prepared for shipment and/or installation in the vehicle 14. In this regard, a portion of the airbag assembly 10 is imparted with a stable shape having a reduced package size. In a first general step, the reinforcing wrapper 22 is coupled to the inflatable airbag 24 proximate a first longitudinally extending edge of the inflatable airbag 24, for example.

In a second general step of the present teachings, an intermediate package is prepared, in which the reinforcing wrapper 22 entirely surrounds a periphery of at least a first portion of the inflatable airbag 24. The inflatable airbag 24 may be rolled and/or folded. In the embodiment illustrated, the intermediate package is created by rolling the inflatable airbag 24 about the rolling axis A which is parallel to a longitudinal axis of the inflatable airbag 24, beginning with a second or lower longitudinally extending side 24B of the inflatable airbag 24. The inflatable airbag 24 may be rolled with an automated rolling machine around the axis A. In applications where a mandrel is used, the mandrel may be subsequently withdrawn from the resulting package. In other embodiments, however, the intermediate package can be formed by folding the inflatable airbag 24, or by creating two or more rolls in the inflatable airbag 24, or even by a combination of rolling and folding of the inflatable airbag 24.

In accordance with the present teachings, the roll process of the inflatable airbag 24 is initiated and, where an adhesive 42 covered by a paper backer 44 is used, continued until the inflatable airbag 24 is almost completely rolled about the axis A. When the inflatable airbag 24 reaches the last approximately 360 degrees of rolling, for example, the removable paper backer 44 of the reinforcing wrapper 22 may be removed to expose the adhesive 42. Continued rolling of the inflatable airbag 24 peripherally wraps the reinforcing wrapper 22 completely about at least a portion of the rolled airbag 24. The tab 38 passes through a second opening or slot 39 in the reinforcing wrapper 22. The adhesive 42 (or Velcro®, or other manner of fastening) maintains the reinforcing wrapper 22 about the portion of the rolled airbag 24 and the rolled airbag 24 may be removed from the rolling machine.

The inflatable airbag 24 and the reinforcing wrapper 22 cooperate to define a monotonously rolled portion of the airbag assembly 10. Explaining further, the inflatable airbag 24 and the reinforcing wrapper 22 define a continuous coil extending from the second longitudinally extending side 24B of the inflatable airbag 24 to a free side 22A of the reinforcing wrapper 22. The second longitudinally extending side 24B of the inflatable airbag 24 is at a center of the monotonously rolled portion of the airbag assembly 10. The continuously coiled and monotonously rolled portion of the airbag assembly 10 resultantly includes an innermost portion defined by the inflatable airbag 24, an outermost portion defined by the reinforcing wrapper 22, and an intermediate portion defined by the reinforcing wrapper and the intermediate portion defined by an overlapping area of the inflatable airbag and the reinforcing wrapper.

In a third general step of the present teachings, the intermediate package formed by rolling the inflatable airbag 24 and the reinforcing wrapper 22 is heated to melt or soften the material of the reinforcing wrapper 22. In this regard, the reinforcing wrapper 22 may be heated to a temperature that is above some of the melting point of some of the fibers of the reinforcing wrapper 22 and below the melting point of other of the fibers. In one application, the intermediate package is placed within a nest or mold cavity of a pressing tool 46 heated to a predetermined temperature of at least about 150 degrees C. The nest of the pressing tool 46 may be transferred by robot or otherwise to an infrared (IR) oven.

In this particular application, the intermediate package may be heated during a dwell time of approximately 30 seconds.

Figure 7:
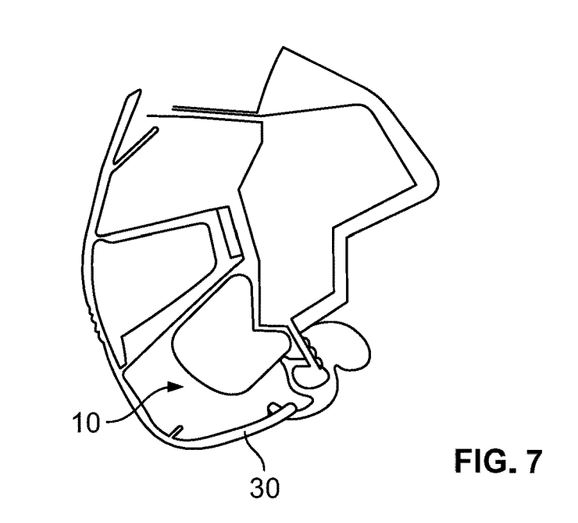
FIG. 7 is a simplified cross-sectional view taken along the line 7-7 of FIG. 1 and illustrating the airbag assembly of the present teachings compressed to have a reduced package size with an exemplary profile for a specific application, the cross-sectional view further illustrating exemplary trim components associated with the A-pillar.

The nest may be defined by a first or lower nesting member 48 that cooperates with a second or upper nesting member 50. The nesting members 48 and 50 may be configured in any desired shape for producing a desired profile to meet vehicle packaging requirements. In the embodiment illustrated, the first nesting member 48 defines a channel 52 for receiving the intermediate package. The second nesting member 50 is sized and configured to slidingly fit within the first nesting member 48 such that actuation of the pressing tool 46 is effective to drive the second nesting member 50 into the mold cavity of the first nesting member 48, to thereby compress the intermediate package. The second nesting member 50 may be configured to include an undersurface 54 having a three-dimensional profile conforming to a desired shape for the profile of the finished airbag assembly 10 (see FIG. 7). Again, it will be understood that the profile of the finished airbag assembly 10 is merely exemplary.

Figure 8:
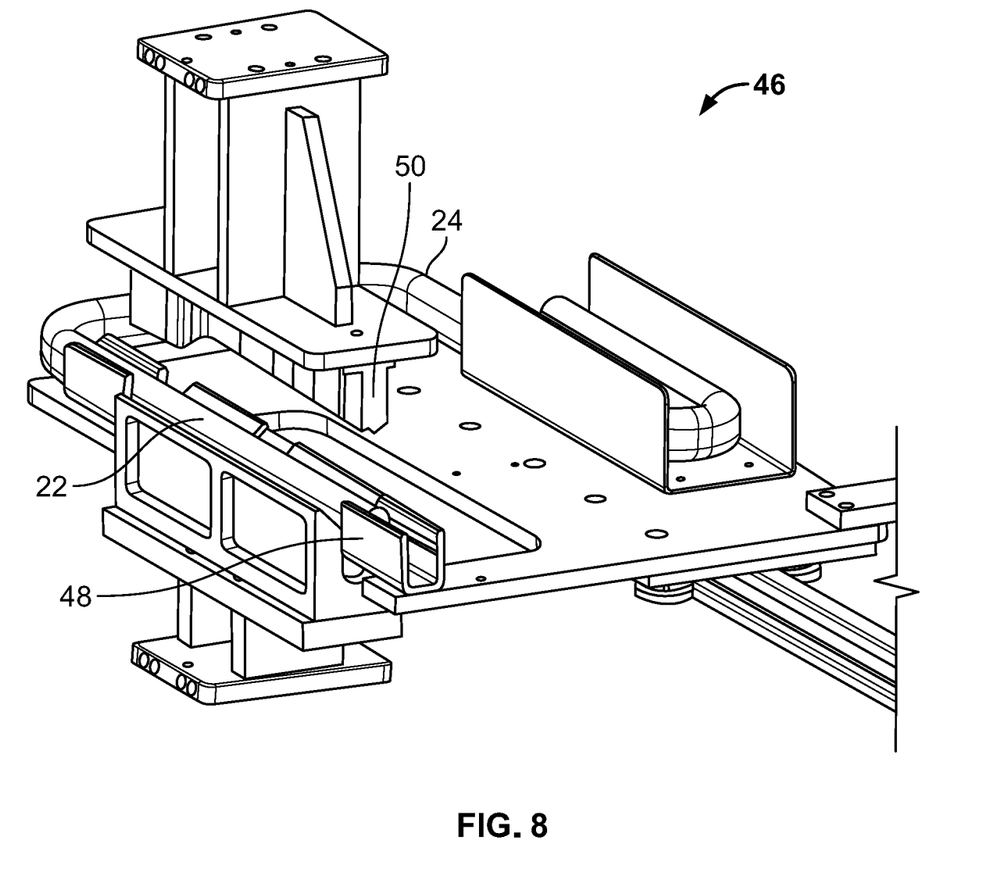
FIG. 8 is perspective view of a pressing tool in accordance with the present teachings for manufacturing an airbag assembly having a reduced package size.
Figure 9:
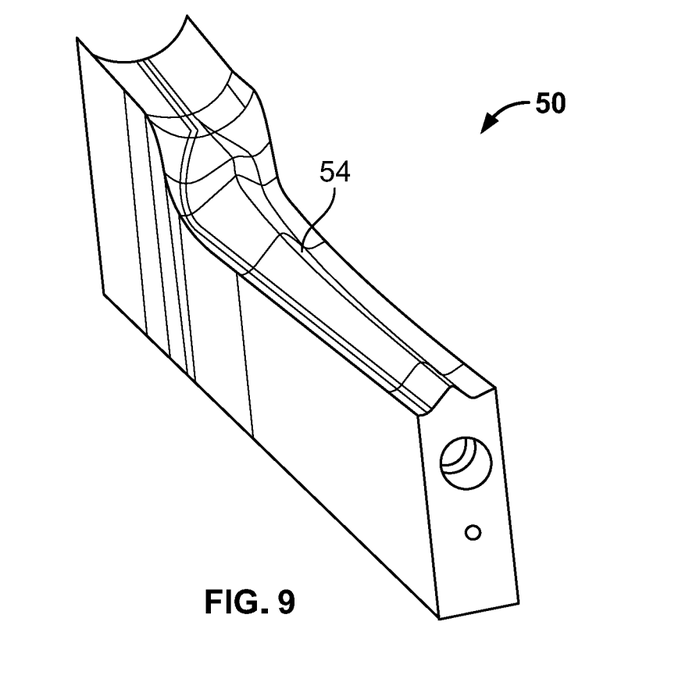
FIGS. 9 and 10 are perspective views of exemplary upper and lower nesting members of the pressing tool of FIG. 8, it being understood that the shape of the nesting members may be readily adapted within the scope of the present teachings for alternate package profiles.
Figure 10:
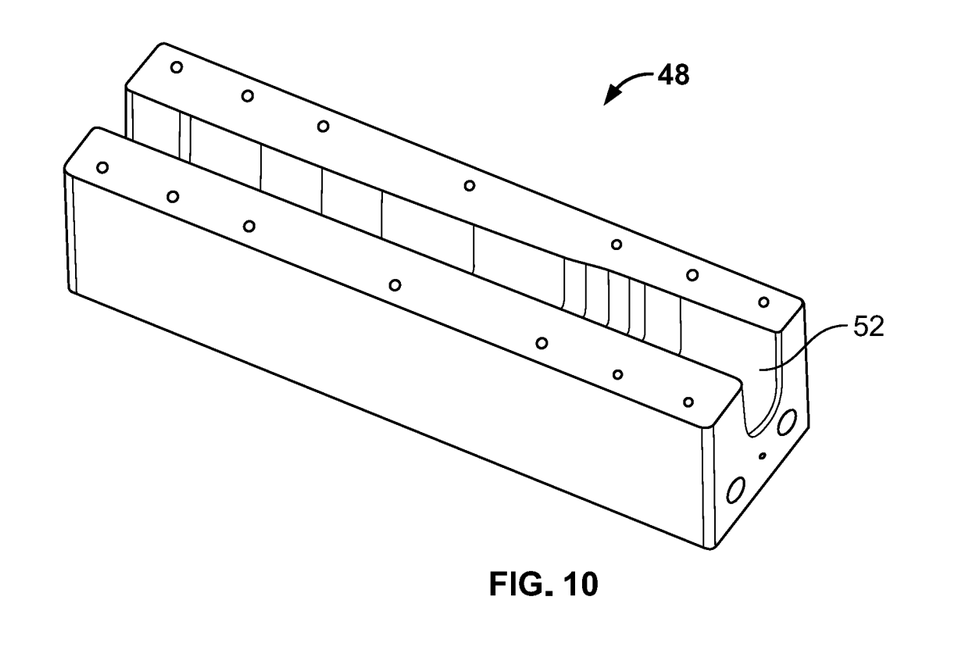

The nest of the pressing tool 46 with heated intermediate package may be transferred by robot or otherwise to the pressing tool 46. In a fourth general step of the present teachings, the pressing tool 46 is actuated while the intermediate package remains heated from the IR oven. In other applications, the intermediate package may be simultaneously heated and pressed (i.e., heated while in the pressing tool 46). Regardless, the material of the reinforcing wrapper is sufficiently heated to allow the pressing tool 46 to conform the intermediate package into the three-dimensional shape defined by the shape of the mold cavity of the first nesting member 48 and the profile of the undersurface 54 of the second nesting member 48.

In a fifth general step, the pressing tool 46 compresses the intermediate package such that the inflatable airbag 24 is under compression and has a reduced package size. Application of pressure to the heated intermediate package plastically deforms the reinforcing wrapper 22 and transforms the intermediate package to a desired shape with a reduced package size. The intermediate package is allowed to sufficiently cool before being removed from the mold so as to maintain the reduced package size. At least some of the fibers of the reinforcing wrapper 22 are now fused to one another to impart a stable shape to the portion of the airbag assembly 10 that is surrounded by the reinforcing wrapper 22. In this regard, the final package has a three-dimensional shape defined by the shape of the mold cavity and the undersurface 54 of the upper nest member 50. This final shape is a stable shape with clearly defined creases that persist after cooling.

The tab 38 passes through the opening 39 in the reinforcing wrapper 22 and may be oriented radially with respect to the rolled, inflatable airbag 24 for mounting of the airbag assembly 10 with the vehicle 14. The tear seam 40 is oriented at a predetermined angle to the opening 39 through which the tab 38 extends relative to the axis A about which the inflatable airbag 24 is rolled. In certain applications, the predetermined angle is between 45 degrees and 180 degrees. In more preferred applications, the predetermined angle is between 60 degrees and 90 degrees. The location of the opening 39 relative to the tear seam 40 allows for optimal positioning of the tear seam 40 when the inflatable airbag 24 is mounted in the vehicle 14 by the tabs 38.

In the event of an actual or impending collision, the inflatable airbag 24 may be deployed. The inflator 26 generates and/or releases inflation gas into the tube 28. From the tube 28, the inflation gas may rapidly enter the inflatable airbag 24, thereby causing the inflatable airbag 24 to begin expanding. The airbag 24 expands downward in the vertical direction 20 along the side of the vehicle 14 between one or more passengers of the vehicle 14 and one or more lateral surfaces of the vehicle 14 such as the side windows and pillars of the vehicle 14. In addition to the A-pillar 30, the pillars may include a B-pillar 32, and a C-pillar 34, for example, all of which may join the roof rail at their respective upper ends. In the embodiment illustrated, the inflatable airbag 24 extends from the A-pillar 30 to the C-pillar 34 of the motor vehicle 14.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure. It will again be appreciated that the configuration of the airbag assembly 10 is merely exemplary. A variety of types and configurations of inflatable airbags, including but not limited to other curtain airbags, may be utilized within the scope of the present disclosure. For example, in alternative embodiments, varying sizes, shapes, and proportions of inflatable curtain airbags may be used. An automaker may select from such alternative embodiments based on the desired location within the vehicle, the anticipated collision type and severity, the likely habits of vehicle occupants, and any other criteria recognized by those of skill in the automotive safety arts.

What is claimed is:

1. An airbag assembly for a motor vehicle, the airbag assembly comprising:
   an inflatable airbag deployable from a stowed condition, the inflatable airbag having a longitudinally extending axis and being rolled about a rotation axis in the stowed condition;
   a reinforcing wrapper coupled to the inflatable airbag proximate a first longitudinally extending side of the inflatable airbag and rolled about the rotation axis, the reinforcing wrapper peripherally wrapped entirely around at least a first portion of the inflatable airbag; and
   at least a first mounting tab having an end attached to the inflatable airbag, the first mounting tab radially disposed between and immediately adjacent to an outer end of the inflatable airbag and an inner end of the reinforcing wrapper,
   wherein the inflatable airbag is wound from the first longitudinally extending side to a second longitudinally extending side opposite the first longitudinally extending side in a first circumferential direction, the reinforcing wrapper is wound from an outer edge to an inner edge in the first circumferential direction, and the first mounting tab is wound from a free end to the end attached to the inflatable airbag in a second circumferential direction, the second circumferential direction being opposite the first circumferential direction,
   wherein the reinforcing wrapper includes an opening, the first mounting tab, and
   wherein the reinforcing wrapper includes an opening, the first mounting tab extending through the opening.

2. The airbag assembly of claim 1, wherein the inflatable airbag and the reinforcing wrapper cooperate to define a monotonously rolled portion of the airbag assembly and wherein the second longitudinally extending side of the inflatable airbag is at a center of the monotonously rolled portion of the airbag assembly.

3. The airbag assembly of claim 1, wherein the inflatable airbag and the reinforcing wrapper cooperate to define a monotonously rolled portion of the airbag assembly and wherein the monotonously rolled portion of the airbag assembly is continuously coiled and includes an innermost portion, an outermost portion and an intermediate portion therebetween, the innermost portion defined by the inflatable airbag, the outermost portion defined by the reinforcing wrapper and the intermediate portion defined by an overlapping area of the inflatable airbag and the reinforcing wrapper.

4. The airbag assembly of claim 1, wherein the reinforcing wrapper includes a longitudinally extending tear seam.

5. The airbag assembly of claim 1, wherein the inflatable airbag is an inflatable curtain airbag.

6. The airbag assembly of claim 5, in combination with a motor vehicle having an A-pillar, a forward-most portion of the airbag assembly being stowed in the A-pillar.

7. The airbag assembly of claim 1, wherein the first mounting tab is secured to the reinforcing wrapper at a point circumferentially opposite the opening for the first mounting tab.

8. An airbag assembly for a motor vehicle, the airbag assembly comprising:
an inflatable airbag deployable from a stowed condition, the inflatable airbag having a longitudinally extending axis and being wrapped about the longitudinally extending axis in the stowed condition;
at least a first mounting tab secured to the inflatable airbag; and
a reinforcing wrapper secured to the first mounting tab and peripherally wrapped entirely around at least a first portion of the inflatable airbag,
wherein
the reinforcing wrapper holds at least the first portion of the inflatable airbag under compression with a reduced package size, the first mounting tab is radially disposed between and immediately adjacent to an outer end of the inflatable airbag and an inner end of the reinforcing wrapper,
the inflatable airbag is wound from a first longitudinally extending side to a second longitudinally extending side opposite the first longitudinally extending side in a first circumferential direction, the reinforcing wrapper is wound from an outer edge to an inner edge in the first circumferential direction, and the first mounting tab is wound from a free end to an opposite end attached to the inflatable airbag in a second circumferential direction, the second circumferential direction being opposite the first circumferential direction, and the reinforcing wrapper includes an opening through which the first mounting tab passes.

9. The airbag assembly of claim 8, wherein the inflatable airbag is rolled about the longitudinally extending axis.

10. The airbag assembly of claim 9, wherein the first mounting tab is secured to the inflatable airbag proximate a first longitudinally extending edge of the inflatable airbag.

11. A method of manufacturing the airbag assembly of claim 8, the method comprising:
coupling the reinforcing wrapper to the inflatable airbag;
preparing an intermediate package by rolling and/or folding the inflatable airbag and wrapping the reinforcing wrapper entirely around a periphery of at least the first portion of the inflatable airbag;
heating the intermediate package with an infrared oven to a predetermined temperature while the intermediate package is in a nest of a pressing tool; and
pressing the intermediate package to reduce a package size of at least the first portion of the airbag assembly.

12. The method of manufacturing according to claim 11, wherein preparing the intermediate package includes:
rolling the inflatable airbag about a rotation axis beginning with a second longitudinally extending edge of the inflatable airbag; and
rolling the reinforcing wrapper about the rotation axis such that the reinforcing wrapper entirely surrounds the periphery of at least the first portion of the inflatable airbag such that the inflatable airbag and the reinforcing wrapper cooperate to define a monotonously rolled portion of the airbag assembly.

13. The method of manufacturing according to claim 11, wherein coupling the reinforcing wrapper to the inflatable airbag includes coupling the reinforcing wrapper to the first mounting tab.

14. The method of manufacturing according to claim 13, wherein the reinforcing wrapper includes a longitudinally extending tear seam oriented at a predetermined angle relative to the opening through which the first mounting tab passes.

15. The airbag assembly of claim 8, wherein the inflatable airbag is rolled about the longitudinally extending axis in the stowed condition and a portion of the first mounting tab is rolled about the longitudinally extending axis in the stowed condition.

16. The airbag assembly of claim 8, wherein the first mounting tab is secured to the reinforcing wrapper at a point circumferentially opposite the opening for the first mounting tab.

* * * * *